United States Patent
Varakin et al.

(10) Patent No.: US 10,055,454 B2
(45) Date of Patent: Aug. 21, 2018

(54) SYSTEM AND A METHOD FOR EXECUTING SQL BASIC OPERATORS ON COMPRESSED DATA WITHOUT DECOMPRESSION PROCESS

(71) Applicant: SQREAM TECHNOLOGIES LTD, Ramat Gan (IL)

(72) Inventors: Kostya Varakin, Haifa (IL); Ami Gal, Kfar HaOranim (IL)

(73) Assignee: SQREAM TECHNOLOGIES LTD, Tel Aviv (IL)

( * ) Notice: Subject to any disclaimer, the term of this patent is extended or adjusted under 35 U.S.C. 154(b) by 433 days.

(21) Appl. No.: 14/432,353

(22) PCT Filed: Sep. 24, 2013

(86) PCT No.: PCT/IL2013/050795
§ 371 (c)(1),
(2) Date: Mar. 30, 2015

(87) PCT Pub. No.: WO2014/049594
PCT Pub. Date: Apr. 3, 2014

(65) Prior Publication Data
US 2015/0278294 A1    Oct. 1, 2015

Related U.S. Application Data

(60) Provisional application No. 61/707,008, filed on Sep. 28, 2012.

(51) Int. Cl.
*G06F 17/30*    (2006.01)
(52) U.S. Cl.
CPC .. *G06F 17/30404* (2013.01); *G06F 17/30153* (2013.01); *G06F 17/30442* (2013.01); *G06F 17/30519* (2013.01)

(58) Field of Classification Search
CPC ................................................. G06F 17/30404
See application file for complete search history.

(56) References Cited

U.S. PATENT DOCUMENTS 9,171,041 B1 * 10/2015 Narayanan ........ G06F 17/30463
2008/0034049 A1    2/2008 Stokes
(Continued)

FOREIGN PATENT DOCUMENTS

WO    03096230 A2    11/2003

OTHER PUBLICATIONS

S. J. O'connell, N. (2003). Performing Joins without Decompression in a Compressed Database System. [online] Citeseerx.ist.psu.edu. Available at: http://citeseerx.ist.psu.edu/viewdoc/summary?doi=10.1.1.582.5701. (Year: 2003).*
(Continued)

*Primary Examiner* — Syed H Hasan
(74) *Attorney, Agent, or Firm* — Browdy and Neimark, PLLC (57) ABSTRACT

The present invention discloses a method for executing an SQL operator on compressed data chunk. The method comprising the step of: receiving SQL operator, accessing compressed data chunk blocks, receive e full set of derivatives of the compression scheme, check compression rules based on the compression scheme and relevant operator for approving SQL operation on compressed data and in case of approval applying respective SQL operator on relevant compressed data chunks.

14 Claims, 7 Drawing Sheets

| indicator | First index | Results string original order | Second index | Result string alphabetic order |
|---|---|---|---|---|
| 0/1 | 0 | C | 5 | A |
| 0/1 | 1 | C | 6 | A |
| 0/1 | 2 | B | 7 | A |
| 0/1 | 3 | B | 8 | A |
| 0/1 | 4 | B | 9 | A |
| 0/1 | 5 | A | 2 | B |
| 0/1 | 6 | A | 3 | B |
| 0/1 | 7 | A | 4 | B |
| 0/1 | 8 | A | 0 | C |
| 0/1 | 9 | A | 1 | C |

(56) References Cited

U.S. PATENT DOCUMENTS

2009/0089544 A1* 4/2009 Liu .......................... G06F 8/45
                                                              712/30
2009/0171999 A1* 7/2009 McColl ............. G06F 17/30539
2012/0054225 A1   3/2012 Marwah et al.
2013/0166566 A1   6/2013 Lemke et al.
2014/0365533 A1* 12/2014 Debray ............. G06F 17/30474
                                                              707/803

OTHER PUBLICATIONS

Abadi et al; "Integrating Compression and Execution in Column-Oriented Database Systems" SIGMOD '06 Proceedings of the 2006 ACM SIGMOD international conference on Management of data pp. 671-682 . (Jun. 2006).

* cited by examiner

| indicator | First index | Results string original order | Second index | Result string alphabetic order |
|---|---|---|---|---|
| 0/1 | 0 | C | 5 | A |
| 0/1 | 1 | C | 6 | A |
| 0/1 | 2 | B | 7 | A |
| 0/1 | 3 | B | 8 | A |
| 0/1 | 4 | B | 9 | A |
| 0/1 | 5 | A | 2 | B |
| 0/1 | 6 | A | 3 | B |
| 0/1 | 7 | A | 4 | B |
| 0/1 | 8 | A | 0 | C |
| 0/1 | 9 | A | 1 | C |

Figure 9 ated States Patent No. US 10,055,454 B2

SYSTEM AND A METHOD FOR EXECUTING SQL BASIC OPERATORS ON COMPRESSED DATA WITHOUT DECOMPRESSION PROCESS

BACKGROUND

Technical Field

The present invention relates generally to a method for Executing SQL Basic Operators on Compressed Data without Decompression Process.

BRIEF SUMMARY

The present invention discloses a method for executing an SQL operator on a compressed data chunk. The method comprising the step of: receiving the SQL operator, accessing compressed data chunk blocks, receiving a full set of derivatives of the compression scheme, checking compression rules based on the compression scheme and a relevant operator for approving an SQL operation on compressed data and in case of approval, applying a respective SQL operator on relevant compressed data chunks.

The present invention discloses a method for executing an SQL operator on a compressed data chunk using at least one HWA. The method comprising the step of: receiving the SQL operator, accessing compressed data chunk blocks, receiving a full set of derivatives of the compression scheme, checking compression rules based on the compression scheme and a relevant operator for approving an SQL operation on compressed data, wherein the compression scheme is at least one of a FOR scheme or a BWT scheme, and in case of approval, applying a respective SQL operator utilizing multiple threads of the HWA unit on relevant compressed data chunks.

According to some embodiments of the present invention the SQL operator is approved when each uncompressed data unit is an algebraic transformation of according to single offset value.

According to some embodiments of the present invention the operator is a ort operation and the sort operation is applied directly on the compressed data.

According to some embodiments of the present invention, the operator is a merge operation, wherein before the merge operation is applied, a preformed offset alignment is performed on all compressed chunks utilizing multiple threads of the at least one HWA unit based on vector/super-scalar architecture, and the merge is applied on the aligned compressed chunk.

According to some embodiments of the present invention, the operator is a join operation, wherein before the join operation is applied, an algebraic transformation is performed by recalculating offset values of the relevant data chunks utilizing multiple threads of the at least one HWA unit based on vector/super-scalar architecture, and the join operation is applied on the transformed data of the relevant data chunk.

According to some embodiments of the present invention, the operator is a reduce operation, wherein the reduce operator is approved if the reduce operator is obeying the commutative property, and wherein the reduce operation is applied on the transformed data of the relevant data chunk.

According to some embodiments of the present invention, the operator is a hash function, wherein the reduce operator is approved if the hash function is injective not only for original values but also for result values, and the hash function is applied on compressed data for mapping compressed data unit using the hash function.

According to some embodiments of the present invention, the SQL operators are applied at least partly while the data is uncompressed, wherein the part of the data chunks are uncompressed sequentially one after the other, wherein the operators are applied on the already decompressed parts.

According to some embodiments of the present invention, the compression scheme is BWT, wherein the decompression process applies multiple threads for analyzing multiple index rows of the BWT result string, enabling to provide partial decompression results through the compression process.

The present invention discloses a system for executing an SQL operator on a compressed data chunk using at least one HWA. The system is comprised of: a database of clustered compressed data chunks including a compression scheme, at least one HWA unit, at least one CPU unit, SQL operators module for receiving the SQL operator, accessing compressed data chunk blocks, receiving a full set of derivatives of the compression scheme, checking compression rules based on the compression scheme and a relevant operator for approving a SQL operation on compressed data, wherein the compression scheme is at least one of a FOR scheme or a BWT scheme; and in case of approval, applying the respective SQL operator utilizing multiple threads of the HWA unit on relevant compressed data chunks.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "HWA (HardWare Accelerator)" as used herein in this application, is defined as any hardware that connected to the main Central Processing Unit (CPU) through a Peripheral Component Interconnect (PCI) bus and encompassing a multiple computational core inside. Examples are GPGPUs (with 1000s of cores), and Intel MICs (with 10s of cores).

In a normal compression scheme, the compression of data unit of size S0 is transformed into another data unit of a constant and predefined size S1 (S0>S1) according to a predefined full set of derivatives of this compression scheme. The term "Derivatives" as used herein in this application, is defined as a plurality of algebraic operations applied on data units for decompressing data a container consisting of plurality of compressed data units. Example: FOR (Frame Of Reference) Compression, derivatives: pFOR (Patched FOR), pFORd (patched FOR on Deltas) Frame of Reference (FOR): FOR determines the range of possible values in a block, called a frame, and maps each value into this range by storing just enough bits to distinguish between the values.

The term "SQL: Structured Query Language" as used herein in this application is defined as a variant of DSL. It is also transformed to a set of Map-Reduce operators to be executed by MRF, exactly as DSL. Example: Apache Hive SQL dialect called HQL.

Patched Frame Of Reference (PFOR) is an extension of FOR that is less vulnerable to outliers in the value distribution. PFOR stores outliers as exceptions such that the frame of reference [0; max] is greatly reduced. Delta encoding technique in a compression scheme stores the difference between the previous integer and the current one in the uncompressed string, instead of storing the original string integer. This allows encoding an ordered list of integers using a smaller number of characters, which can be encoded in fewer bits.

The term "BWT (Burrows-Wheeler transform)" as used herein in this application is defined as a compression technique which identifies repeated patterns in the data and encodes the duplications more compactly by rearranging the data character string into sequences having similar characters.

Figure 1:
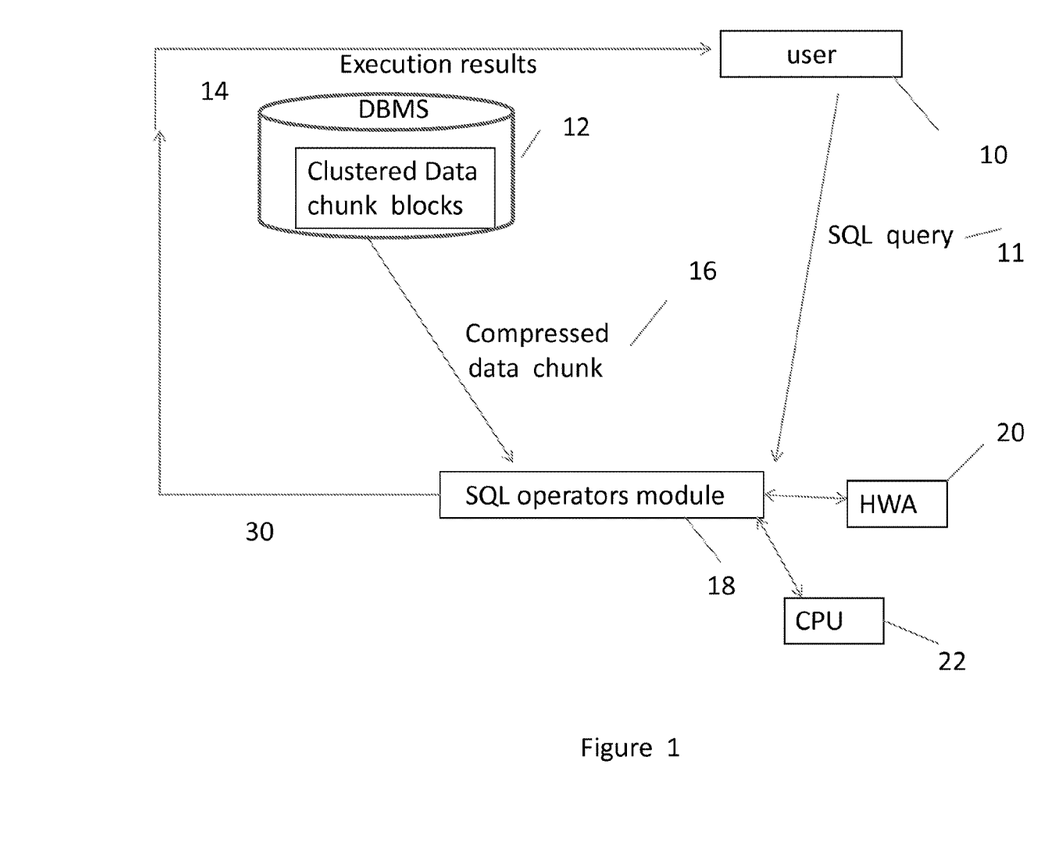
FIG. 1 illustrates a block diagram showing the entities and modules involved in processing user SQL operators on compressed data, according to some embodiments of the invention.

FIG. 1 illustrates a block diagram showing the entities and modules involved in processing a user SQL operator on compressed data chunks, according to some embodiments of the invention. A user 10 initiates an SQL query (11), which is sent to the SQL operator module (18). The SQL operators module runs at least one operator of the query on the compressed data chunk blocks stored on the Database Mass Storage (DBMS) using the HWA (20) or the CPU unit 22. Such a process eliminates the need to uncompress at least part of the data chunks on runtime, hence, accelerating the processing of the operators.

Figure 2:
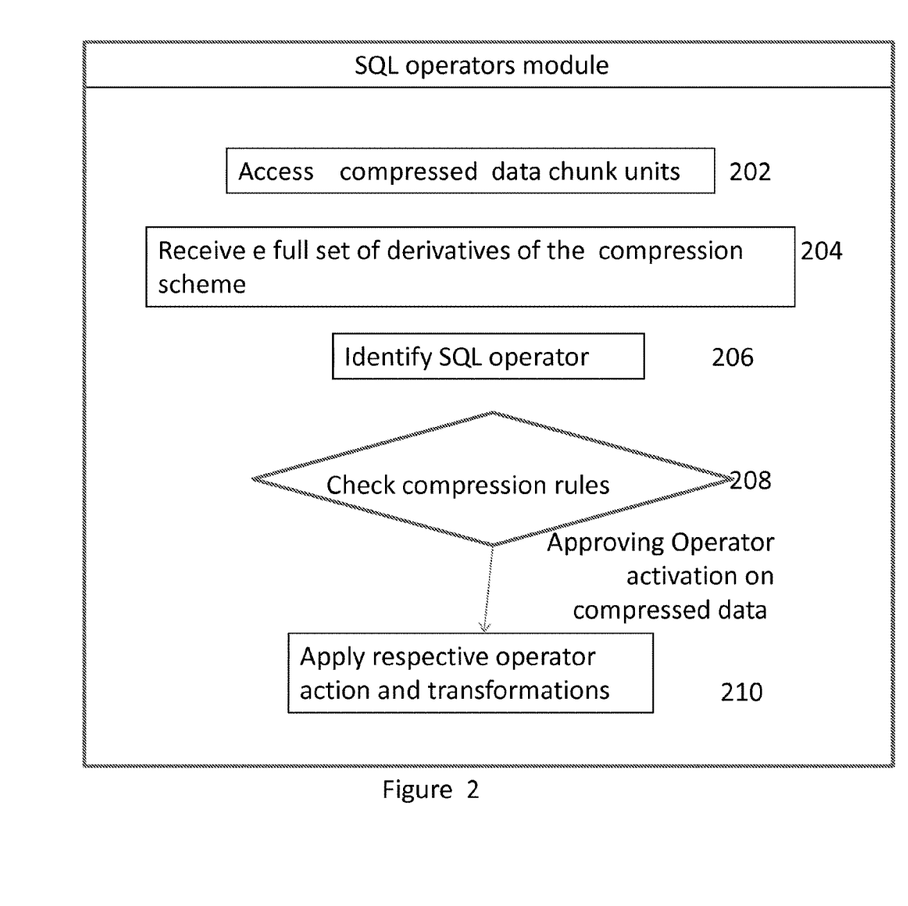
FIG. 2 is a flow diagram of SQL operators module processing, according to some embodiments of the invention.

FIG. 2 is a flow diagram of the SQL operators module processing, according to some embodiments of the invention. The module accesses multiple compressed data chunk blocks stored on a DBRM (202) and receives a full set of derivatives of the compression scheme (204). The SQL operators to be applied are identified by checking the user query (206). At the next step, compression rules are examined which are relevant for each operator (208). The rules determine if it's possible to apply the determined operator without decompressing the data chunks. Examples of the rules are detailed below for each type of operator. In case of approval, the respective operator is applied directly on the compressed data chunks or on an algebraic transformation thereof, which is relevant for the specific operator and compression scheme (210).

Figure 3:
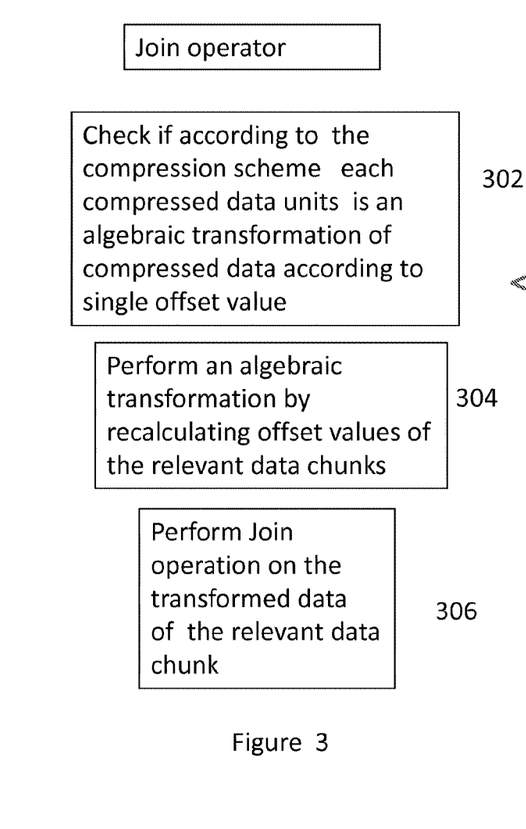
FIG. 3 is a flow diagram of the joint operator processing, according to some embodiments of the invention.

FIG. 3 is a flow diagram of a join operator processing, according to some embodiments of the invention.

Before performing the join operation, the compression scheme is examined to check whether each uncompressed data unit is an algebraic transformation of compressed data according to a single offset value (302). If yes, the algebraic transformation is applied on the compressed data chunks by recalculating the offset values of the relevant data chunks (304).

For example in a pFORd scheme: only deltas between integers of the string are collected, requiring changing offsets to have a common value and recalculating the deltas accordingly. This recalculating process is an algebraic transformation and could be performed by each execution unit in a vector/super-scalar architecture.

At the next step the join operation is performed on the transformed data of the relevant compressed data chunks (306). The join operation may include finding an intersection or a non-intersected area. The advantage is of applying the join operation on a transformed data unit and not requiring decompressing the data chunk in real time, is reducing memory consumption throughout the process.

Figure 4:
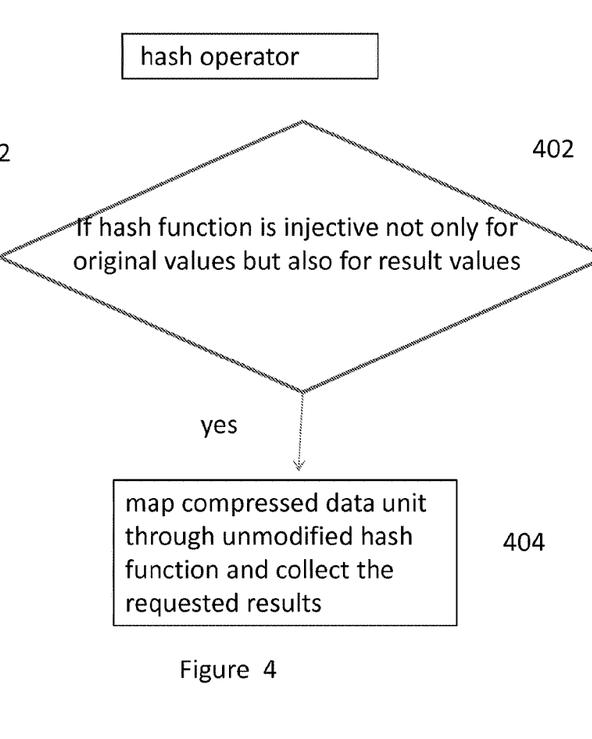
FIG. 4 is a flow diagram of the hash operator processing, according to some embodiments of the invention.

FIG. 4 is a flow diagram of the hash operator processing, according to some embodiments of the invention. In most cases, a hash operation on compressed data is not possible.

In case the hash function is injective not only for original values but also for result values, the HASH function can be applied on the uncompressed data chunks by mapping the compressed data unit through unmodified hash function (404).

If a hashing process is used for a join or reduce operations as follow-up operations, an algebraic transformation on compressed data units can be optionally performed as mentioned above (FIG. 4) (an algebraic transformation of compressed data according to a single offset value).

In general case each compressed unit must be decompressed before the hashing operation is performed.

Figure 5:
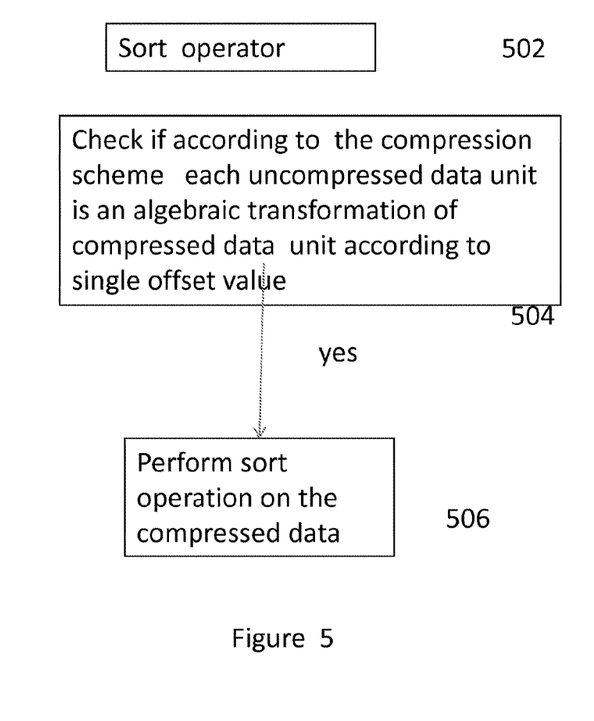
FIG. 5 is a flow diagram of the sort operator processing, according to some embodiments of the invention.

FIG. 5 is a flow diagram of the sort operator processing, according to some embodiments of the invention;

Before performing the sort operation, the compression scheme is examined to check if each uncompressed data unit is an algebraic transformation of compressed data unit according to a single offset value (502).

At the next step, the sort operation is applied on the compressed data units on the relevant data chunk units (504).

Figure 6:
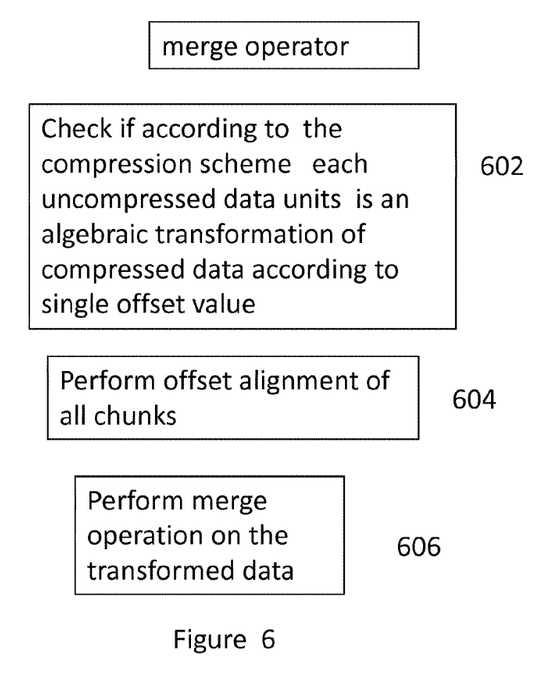
FIG. 6 is a flow diagram of the merge operator processing, according to some embodiments of the invention.

FIG. 6 is a flow diagram of the merge operator processing according to some embodiments of the invention.

Before performing the merge operation, the compression scheme is examined to check if each uncompressed data unit is an algebraic transformation of a compressed data unit according to a single offset value (602). If yes, an algebraic transformation is applied on the compressed data chunks by recalculating offset values of the relevant data chunks (604). At the next step, the merge operation is applied on the transformed data of the relevant compressed data chunks (606).

Figure 7:
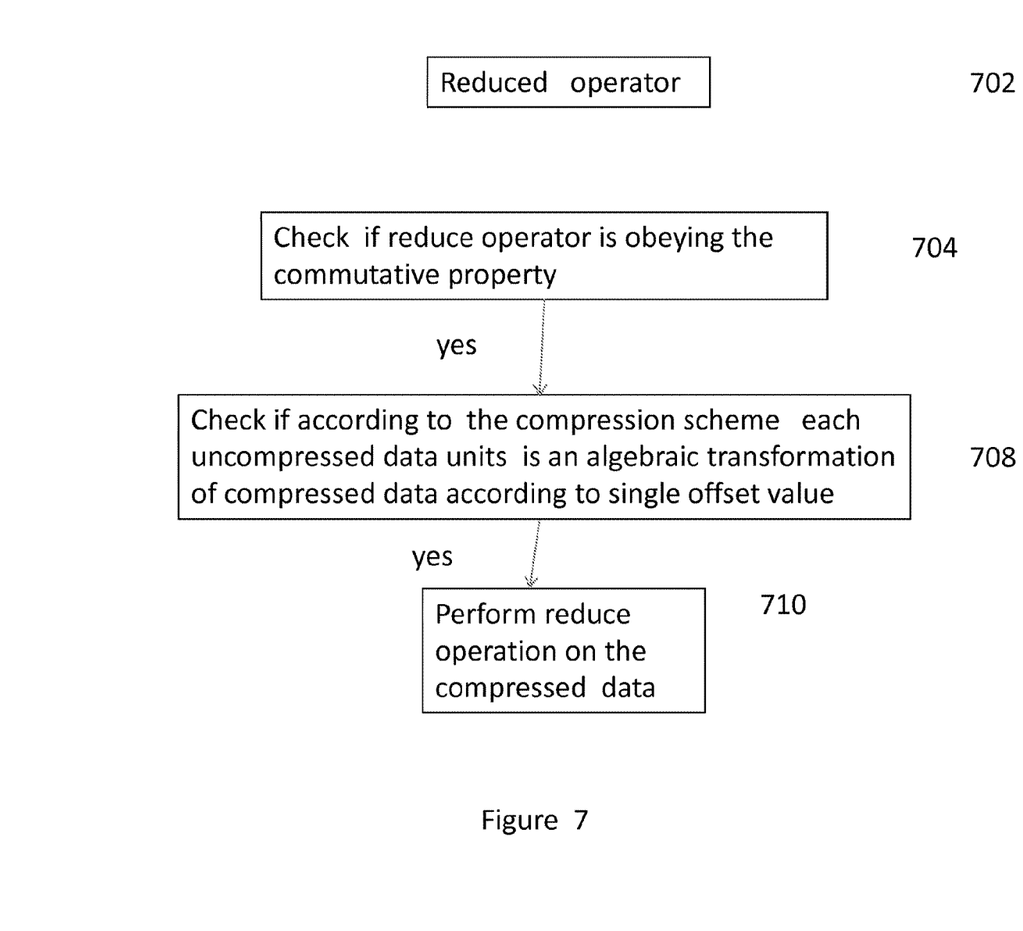
FIG. 7 is a flow diagram of the reduce operator processing, according to some embodiments of the invention.

FIG. 7 is a flow diagram of the reduce operator processing, according to some embodiments of the invention;

In case the reduce operator obeys the commutative property (704), it is checked to see if, according to the compression scheme, each uncompressed data unit is an algebraic transformation of a single offset value (708). If yes, a reduce operation is performed on directly on the compressed data (710).

Figure 8:
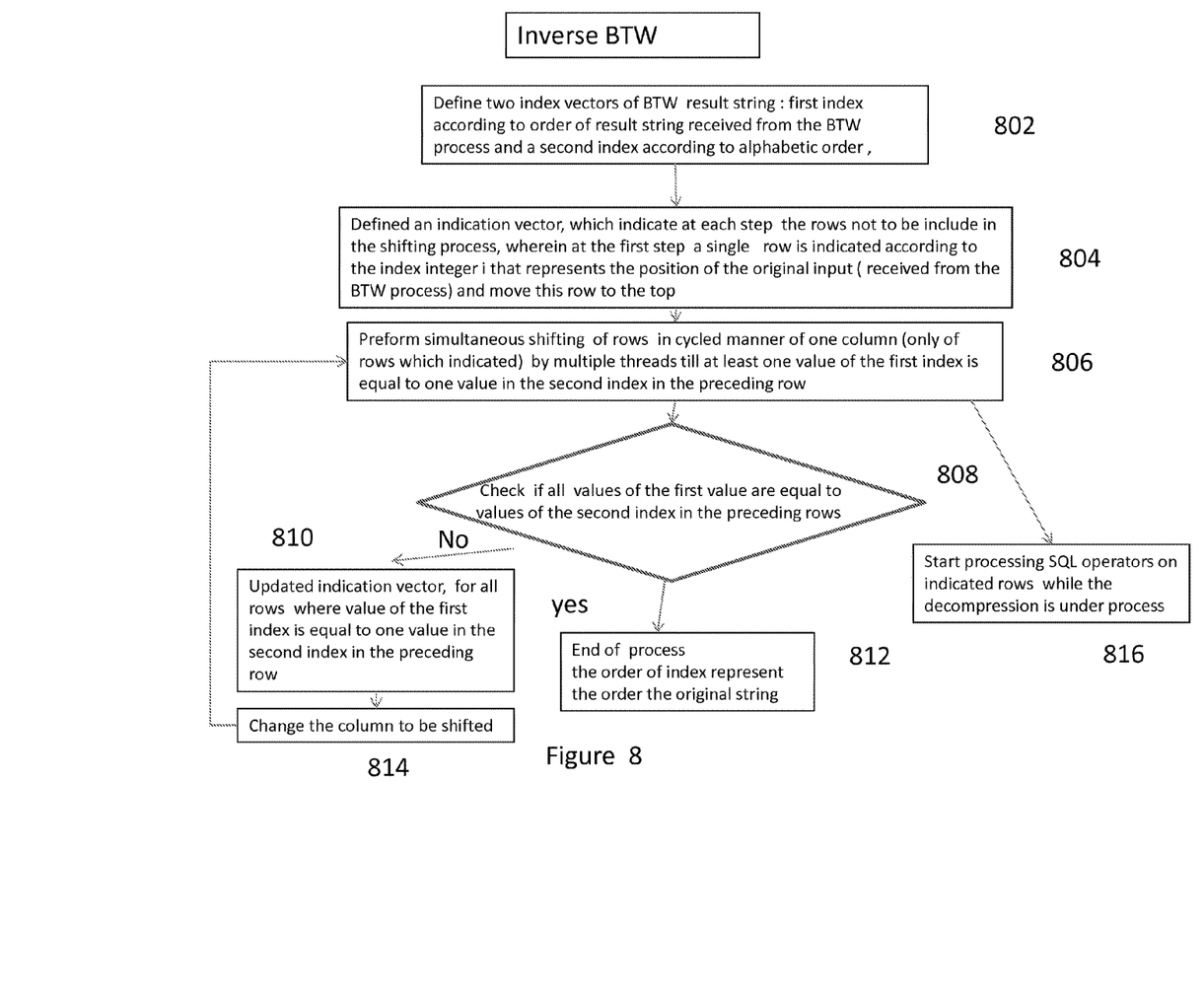
FIG. 8 is a flow diagram of the inverse BWT decompression scheme processing, according to some embodiments of the invention.

FIG. 8 is a flow diagram of the inverse BWT decompression scheme processing, according to some embodiments of the invention.

Figure 9:
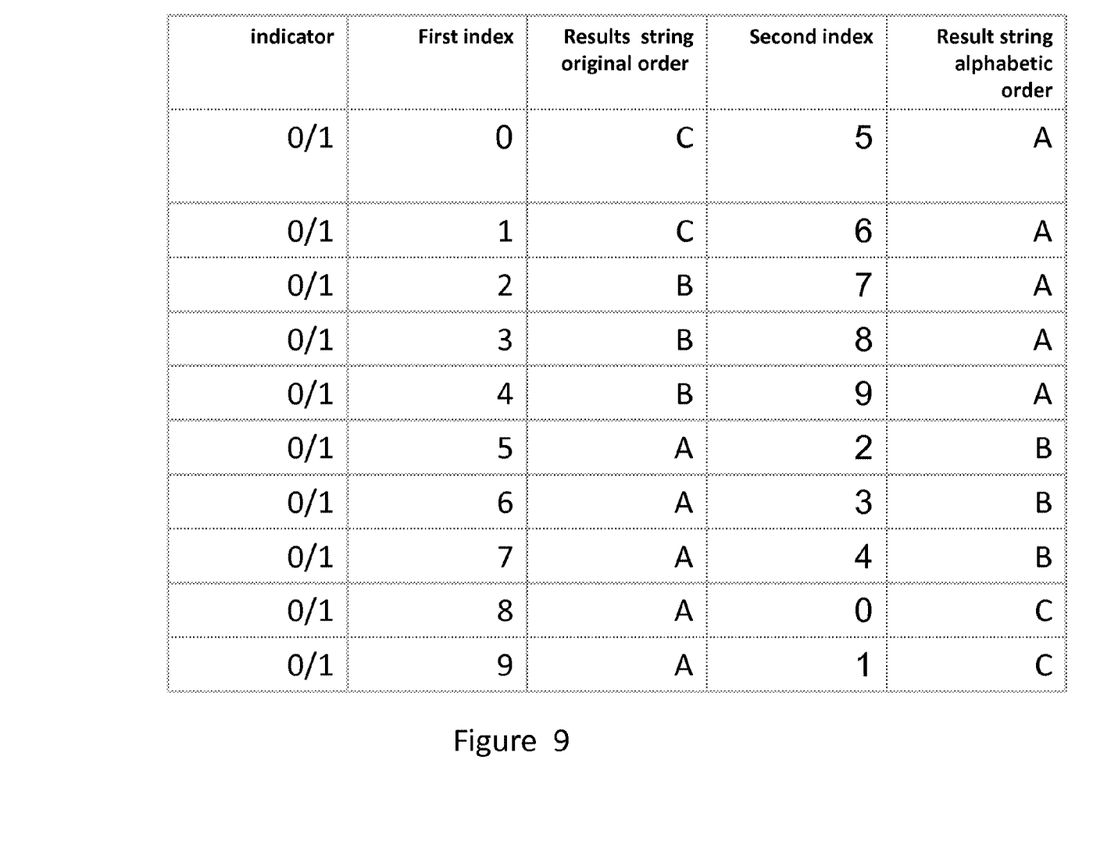
FIG. 9 is an example of created matrix to be used for inverse BWT decompression scheme processing, according to some embodiments of the invention.

Based on the received result string of the BWT compression process, two index vectors of BWT result string are defined: a first index according to the order of received result string from the BWT process and a second index according to an alphabetic order (step 802). A third vector defines an indicator (0,1) for each row included in the shifting process and described below. At the first step, a single row is indicated (receiving the value of 1) according to the index integer i that represents the position of the original input (received from the BWT compression process), the selected row is shifted to the top (step 804). At the end of this definition process a matrix is created including the indication vector, the first index column, the string result column, the second index and the results string in alphabetic order (see FIG. 9).

At each phase of the algorithm, a simultaneous shifting of rows is performed, in a cycled manner of one column of the matrix, shifting only rows which are indicated by the indicator vector, the shifting is performed by multiple threads of the HWA units, until at least one value of the first index is equal to one value in the second index in the preceding row (step 806).

At the end of each phase, the algorithm checks whether all values of the first index values are equal to values of the second index in the preceding rows (step 808). If yes, the algorithm has ended and the order of string at the third/fifth column is the original string before compression (step 812).

If no, the process updates the indication vector, for all rows, where the value of the first index is equal to one value in the second index in the preceding row, sets the value to 1 (step 810) and switches the column to be shifted (step 814).

The SQL operators can be processed on indicated rows while the decompression is under process, thus accelerating the query processing.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

What is claimed is:

1. A method for executing a Structure Query Language (SQL) operator on a compressed data chunk stored on a database management system (DBMS), said method comprising:
   receiving the compression scheme of the compression data chunk, wherein the compression scheme is a Frame of Reference (FOR) scheme, wherein the compression scheme saves delta values based on offset values of each data chunk;
   determining an algebraic transformation of the compression scheme;
   responsively to the determination of the algebraic transformation, calculating numerical offset values of each compressed data chunk block of the compressed data chunk;
   changing numerical offset values of all the compressed data chunk blocks to generate transformed compressed data chunk blocks having common offset values and recalculate the delta values accordingly, utilizing multiple threads of a Hardware Accelerator (HWA) unit to process the compressed data chunk blocks to generate the transformed compressed data chunk blocks, wherein the HWA has a superscalar vector architecture; and
   applying the SQL operator having an algebraic operation to the transformed compressed data chunk blocks, utilizing the multiple threads of the HWA unit to apply the SQL operator to the transformed compressed data chunk blocks.

2. The method of claim 1, wherein the SQL operator is applied to the compressed data chunk blocks only when the compression scheme includes an algebraic transformation.

3. The method of claim 2, wherein the SQL operator is a sort operation.

4. The method of claim 2, wherein the SQL operator is a merge operation and wherein utilizing multiple threads of the HWA unit comprises performing an offset alignment of all compressed data chunk blocks.

5. The method of claim 2, wherein the SQL operator is join operation.

6. The method of claim 2, wherein the SQL operator is a reduce operation having a commutative property.

7. The method of claim 1, wherein the SQL operator is an injective hash function.

8. A system for executing a Structure Query Language (SQL) operator on a compressed data chunk, said system comprising:
   a database configured to store a compressed data chunk including compression scheme;
   at least one Hardware Accelerator (HWA) unit having a superscalar vector architecture;
   at least one Central Processing Unit (CPU); and
   at least one memory communicatively coupled to the at least one CPU comprising computer-readable instructions that when executed by the at least CPU cause the computer-based system to implement a method including receiving the compression scheme of the compressed data chunk, wherein the compression scheme is a Frame of Reference (FOR) scheme, wherein the compression scheme saves delta values based on offset values of each data chunk, determining an algebraic transformation of the compression scheme, responsively to the determination of the algebraic transformation, calculating numerical offset values of each compressed data chunk utilizing the compression scheme, applying the numeric offset values to the compressed data chunk to generate transformed compressed data chunk blocks having common offsets values and recalculate the delta values accordingly, utilizing multiple threads of a Hardware Accelerator (HWA) unit to process the compressed data chunk blocks to generate the transformed compressed data chunk blocks, wherein the HWA has a superscalar vector architecture; and applying the SQL operator having an algebraic operation to the transformed compressed data chunk blocks utilizing the multiple threads of the HWA unit to apply the SQL operator to the transformed compressed data chunk blocks.

9. The system of claim 8, wherein the SQL operator is applied to the compressed data chunk blocks only when the compression scheme includes an algebraic transformation.

10. The system of claim 9, wherein the SQL operator is a sort operation.

11. The system of claim 9, wherein the SQL operator is a merge operation, and wherein utilizing multiple threads of the least one HWA unit comprises performing an offset alignment of the compressed data chunk blocks.

12. The system of claim 9, wherein the SQL operator is a join operation.

13. The system of claim 9, wherein the SQL operator is a reduce operation having a commutative property.

14. The system of claim 8, wherein the SQL operator is an injective hash function.

* * * * *